Patented June 26, 1951

2,558,159

UNITED STATES PATENT OFFICE 2,558,159

LOWERING THE ELECTRICAL RESISTANCE OF SOILS AND OF ELECTRODE-TO-SOIL CONTACTS

Ivar Harry Sanick, Stockholm, Sweden

No Drawing. Application June 10, 1949, Serial No. 98,386. In Sweden May 8, 1948

20 Claims. (Cl. 174—6)

This invention relates to lowering the electrical resistance of soils and of electrode-to-soil contacts; and it comprises a method of improving the electrical conductivity of soil wherein the soil is impregnated with a solution or solutions capable of forming in situ a semi-permeable gel of a metal compound which is substantially insoluble in water but having a high electrical conductivity, said gel being preferably a ferrocyanide or ferricyanide of one or more of the metals copper, cobalt and nickel; all as more fully hereinafter set forth and as claimed.

It is well known that many difficulties are involved in establishing good ground connections between conductors and the soil. Such connections are widely used in the case of lightning rods and arrestors, in the so-called earth wires of power lines, in the grounding of transformer zero points, in the grounding of radio receivers and transmitters, in the electrolytic protection of pipe lines from corrosion, in the ground returns of various electrical circuits etc. In such connections it is essential not only that the soil itself possess a good electrical conductivity but also that the contact resistance between the conductor and the soil have a minimum value. This contact resistance is usually highly variable and depends upon the nature of the soil, its moisture content and various other factors. Clay soils and those containing a substantial content of natural humus usually have a satisfactory electrical conductivity while sandy or gravelly soils usually have a very poor conductivity. In such soils it usually is necessary to employ an elaborate network of wires and/or ribbons to produce a satisfactory ground connection, as pointed out in my prior application Serial No. 27,819, filed May 18, 1948, of which this application is a continuation-in-part.

Many expedients have been used to improve soil conductivity. In some cases metal powders have been mixed with the soil while in other cases coke or carbon has been employed to improve the electrical contact. In some cases poorly conducting soils have been replaced with soils having a greater conductivity. All of these methods have been expensive and none have proved to be entirely satisfactory. For these reasons there has long been a demand in the art for a convenient and inexpensive way of increasing soil conductivity and decreasing the resistance of soil-to-electrode contacts.

I have discovered what appears to be an ideal solution of this problem. In my new method a semi-permeable highly-conducting gel which is substantially water insoluble is formed in situ in the soil at the electrode-to-soil contact and in the region of this contact. I have made the surprising discovery that gels of this type retain their high electrical conductivity without deterioration over long periods of time, their conductivity being substantially unaffected by leaching from rain or by ground water. The most useful gels of this type which I have tested are those made from soluble salts of the metals copper, nickel and/or cobalt with soluble ferro- and ferri-cyanides, but all gels of this general type are operative. These salts are dissolved in water and the soil to be treated is permeated with the resulting solutions either successively or in admixtures. If the solutions are rather dilute they can be mixed and the soil permeated therewith before the formation of a gel. It is also possible to delay the formation of the gel by the addition of a volatile gel-retarding agent to the mixture. If the two solutions are passed into the soil successively I have found that it is advantageous to use the metal salt first. The apparent reason for this is that the gel formed is permeable to the ferro- and ferri-cyanide ions but not to the metal ions, which probably explains why the gel becomes more widely diffused through the soil when the metal salt is added first.

The solutions or mixtures used in the described method can be introduced into the soil to be treated by conventional methods, such as by passing them through a pipe or pipes which are perforated at their ends. These pipes can then be used as the ground leads if desired or, if the leads are already placed, the solutions can be introduced into the soil in close proximity to the ground contacts so that the contacts become embedded in the gel as it is formed. If the solutions are introduced into the ground separately they can be passed through the same pipe or through two different but adjacent pipes. The distance of penetration of the solution or solutions can be regulated by the pressure employed in forcing the liquids through the pipes.

While all water soluble salts of the metals copper, nickel and cobalt can be used in my invention, it is of course more economical to employ copper salts in preference to salts of nickel and cobalt. Copper sulfate and chloride are the most available copper salts and either of these are satisfactory. Any water soluble ferro- and ferri-cyanide salts can be used and for economical reasons the alkali metal or ammonium salts of these anions are the most economical to use. Sodium or potassium ferrocyanide and ferricyanide are the most readily available and cheapest to use.

The two gel-forming components should be used in substantially combining or gram-equivalent proportions. The chemical reaction involved between copper sulfate and potassium ferrocyanide, for example, is:

$$2CuSO_4 \cdot 5H_2O + K_4Fe(CN)_6 \cdot 3H_2O =$$
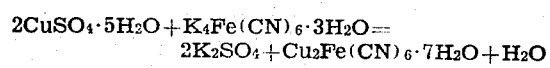
$$2K_2SO_4 + Cu_2Fe(CN)_6 \cdot 7H_2O + H_2O$$

The strength of the solutions employed can be varied rather widely but it is usually more advantageous to employ concentrated solutions approaching saturation. If it is desired to increase the conductivity of the ground over a wide area and if a large increase in conductivity is not required it is possible to employ rather dilute solutions of the order of 1 to 5 per cent by weight, while for smaller areas and for the production of substantial increase in conductivity I usually employ concentrations of the order of 20 to 30 per cent by weight.

If the two solutions are to be introduced in admixture it is advisable to delay the gel formation either by the use of dilute solutions or by the addition of a volatile solubilizing or gel-retarding agent such as ammonium hydroxide. Gel formation can be delayed for long periods by the addition of ammonia even when concentrated solutions of the reactants are employed. As the ammonia is volatilized or becomes dissipated by reaction or absorption by various components of the soil, gel formation then takes place. Delays ranging from several hours up to several days can be obtained by the addition of up to about 10-15 per cent of ammonium hydroxide to a mixture of copper sulfate and sodium ferrocyanide, for example.

I have made a series of comparative tests to determine the relative merits of a sodium chloride solution and of one of my gels for lowering the specific resistance of a mass of sand. These tests were made in a glass conductivity cell partly filled with ignited and washed sand, the cell being equipped with two electrodes for measuring the resistance offered by the sand and with means for introducing and draining liquid from the cell. The cell was first filled with sand which was washed with distilled water until a constant value for the specific resistance was obtained, this value being 35.9 ohms. 60 ml. of a 25 per cent solution of sodium chloride was then added, the resistance falling to $1.6 \times 10^{-3}$ ohm. The sand was then washed repeatedly by passing 25 ml. volumes of distilled water through the cell to see how rapidly the sodium chloride would be washed out of the sand. It was found that the original resistance of 35.0 ohms was obtained after only 17 volumes (25 ml.) of distilled water had been passed through the cell.

In a comparative test using the new process I first introduced 30 ml. of 0.59 N potassium ferrocyanide into the cell and this was followed by the addition of 30 ml. of a 1 N copper sulfate solution. My copper ferrocyanide gel was thus formed in situ in the sand. The resistance reached a constant value of $4.91 \times 10^{-3}$ after a period of 17 hours. Then the washing procedure described above was followed by adding 25 ml. portions of distilled water to the cell and draining similar portions off. The resistance of the cell increased rather rapidly at first and then more slowly, a value of 1.89 ohms being reached after a total of 110 volumes (each of 25 ml.) had been passed through the cell. At this point the resistance stopped increasing and remained substantially constant even after 148 volumes of distilled water had passed through the cell.

It is evident from the above tests that the copper ferrocyanide gel retains electrolytes nearly 10 times as long as the sand alone and that even after all electrolytes have been washed out the gel retains a satisfactory conductivity which is approximately 20 times that of distilled water. The portions of liquid drawn off from the cell were tested for ferrocyanide and copper. While these tests were positive through most of the run toward the end they indicated the presence of no more than traces of copper and ferrocyanide which indicates that the copper ferrocyanide gel is substantially stable and resistant to breakdown even after having been washed free of its electrolyte content.

In order to determine whether the copper ferrocyanide gel would be stable even in the presence of electrolytes another run was made at the start of which 30 ml. of a 25 per cent sodium chloride solution was added to the thoroughly washed out gel remaining in the cell from the above described run. This was followed by a similar washing procedure using 25 ml. portions of distilled water. At the start of this run the resistance dropped to $2 \times 10^{-3}$ ohm and after washing with 43 of the 25 ml. portions it had increased to the original value of 1.89 ohms. From this point on the resistance remained substantially constant through 50 washings. At the start of this run the liquid drawn off from the cell gave positive reactions for ferrocyanide but toward the end only traces were present indicating that no substantial breakdown of the gel was caused by the sodium chloride treatment. None of the liquid drawn off during the run showed the presence of copper.

Experiments similar to the above show that copper ferricyanide gels produce substantially the same increase in conductivity and are equally stable towards washing out tests and also that the ferrocyanide and ferricyanide gels of the metals nickel and cobalt produce substantially the same results. Tests in the field confirm these laboratory experiments and show that a remarkable increase in the electrical conductivity of soils can be produced by the formation of these gels in situ and that this increased conductivity remains stable over long periods of time.

The gels of my invention possess the important property of retaining moisture even when the soil dries out in the vicinity of the gel impregnated soil. This property is, of course, of utmost importance in the production of uniform ground connections.

While I have described what I consider to be the most advantageous embodiments of my invention it is evident, of course, that various modifications can be made in the specific procedures which have been described without departing from the purview of this invention. The gel-forming solutions used in my process can be introduced into the soil in any suitable manner and in accordance with local conditions and the type of soil encountered. The most convenient way is by means of pipes having perforations at their ends, as described previously. But ditches can be dug or holes drilled if desired and the solutions introduced into these. The advantage of using a pipe or pipes is that pressure can be applied to the solutions and the solutions forced into the ground to the desired distance and extent. The extent of penetration can be determined by measurement of soil conductivity at a series of points. In its broader aspects my invention contemplates the formation in situ of any stable semipermeable gel of high conductivity in contact with and in the vicinity of a ground contact. The specific gels formed from the metals copper, nickel and cobalt with the ferrocyanide and ferricyanide anions are the most satisfactory gels of this type which I have tested. It is possible, of course, to employ mixed gels formed from mixtures of metals and/or mixtures of anions. As indicated previously the gel-forming solutions used in my process can be mixed before being introduced into the soil or they can be introduced separately and successively in any order desired. If introduced separately they can be passed through the same pipe or through different pipes which may be spaced apart. If two or more pipes are used the two solutions can be passed simultaneously through two or more of the pipes or successively through a series of pipes. Other modifications of my method which fall within the scope of the following claims will be immediately evident to those skilled in this art.

What I claim is:

1. A method of increasing the electrical conductivity of soils and lowering the resistance of electrode-to-soil contacts, which comprises the step of injecting into the soil surrounding such a contact at least one aqueous solution of two chemicals capable of reacting and forming in situ in the soil to be treated a mass of a stable semi-permeable gel of a metal compound which gel is substantially insoluble in water but having a high electrical conductivity.

2. A method of increasing the electrical conductivity of soils and lowering the resistance of electrode-to-soil contacts, which comprises the step of permeating the ground to be treated with gel-forming solutions capable of chemically reacting and then setting to form in situ a gel of a metal compound, which gel is substantially insoluble in water but having a high electrical conductivity.

3. The process of claim 2 wherein the soil is permeated with two different solutions one containing the soluble salt of a metal and the other the soluble salt of an anion capable of reacting with the metal salt to form said gel.

4. The process of claim 2 wherein the soil is permeated with a mixture of two solutions one containing the soluble salt of a metal and the other the soluble salt of an anion capable of reacting with the metal salt to form said gel.

5. The process of claim 4 wherein the two solutions are mixed before being passed into the soil.

6. The process of claim 4 wherein the two solutions are introduced into the soil successively.

7. The process of claim 4 wherein the metal salt solution is introduced into the soil first, this being followed by the introduction of the solution of said anion.

8. The process of claim 4 wherein the two solutions are introduced into the soil in substantially combining proportions.

9. The process of claim 4 wherein the two solutions are employed in concentrations ranging from about 2 per cent to 30 per cent by weight.

10. The process of claim 4 wherein the two solutions are mixed before being introduced into the soil and a volatile gel-retarding agent is added to delay the formation of a gel until after the mixture is placed.

11. The process of claim 10 wherein the gel-retarding agent is ammonia.

12. A method of increasing the electrical conductivity of soils and lowering the resistance of electrode-to-soil contacts, which comprises impregnating the soil to be treated with two solutions one being an aqueous solution of a soluble salt of a metal selected from a class consisting of copper, nickel and cobalt, and the other being an aqueous solution of the soluble salt of an anion selected from the class consisting of the ferrocyanide and ferricyanide anions, in proportions which are capable of forming a semi-permeable gel.

13. A method of increasing the electrical conductivity of soils and lowering the resistance of electrode-to-soil contacts, which comprises permeating the soil to be treated with two aqueous solutions one being a solution of a soluble copper salt and the other a solution of a soluble ferrocyanide solution, the two solutions being used in substantially chemical combining proportions and adapted to form a copper ferrocyanide gel in situ.

14. The process of claim 13 wherein the two solutions are mixed prior to introducing them into the soil and are sufficiently dilute to retard gel formation until after the mixture is placed.

15. The process of claim 13 wherein the two solutions are mixed and sufficient ammonia is added to delay gel formation until after the mixture is placed.

16. A method of increasing the electrical conductivity of soils and lowering the resistance of electrode-to-soil contacts, which comprises passing a concentrated solution of copper sulfate into a soil to be treated, then passing a sodium ferrocyanide solution into the soil in quantity sufficient to react with the copper sulfate to form a copper ferrocyanide gel in situ.

17. A method of improving the electrical conductivity of soil and lowering the electrical resistance between contacts and the ground which comprises impregnating the soil with gel-forming aqueous solutions of a salt of copper and of a gel-forming anion selected from a class consisting of ferrocyanide and ferricyanide and causing a gel to form in situ.

18. A method of increasing the electrical conductivity of soils and lowering the resistance of electrode-to-soil contacts, which comprises passing into the soil to be treated an aqueous solution of a soluble copper salt having a concentration within the range of from about 2 to 30 per cent by weight and also passing into the soil an aqueous solution of a soluble ferrocyanide having a concentration with the range of from 2 to 30 per cent by weight, the two solutions being used in substantially combining proportions to form a copper ferrocyanide gel in situ.

19. A method of increasing the electrical conductivity of soils and lowering the resistance of electrode-to-soil contact, which comprises passing into the soil to be treated an aqueous solution of copper sulfate having a concentration ranging from about 20 to 30 per cent by weight and an aqueous solution of sodium ferrocyanide having a concentration ranging from about 20 to 30 per cent by weight in proportions producing the formation of a copper ferrocyanide gel in situ.

20. A method of increasing the electrical conductivity of soils and lowering the resistance of electrode-to-soil contact, which comprises passing into the soil to be treated an aqueous solution containing from about 2 to 30 per cent by weight of a soluble copper salt and of a soluble ferrocyanide salt and also containing sufficient ammonia up to about 15 per cent by weight to delay gel formation whereby a copper ferrocyanide gel forms in situ.

IVAR HARRY SANICK.

REFERENCES CITED

The following references are of record in the file of this patent:

UNITED STATES PATENTS

| Number | Name | Date |
| --- | --- | --- |
| 1,577,190 | Patrick | Mar. 16, 1926 |
| 1,976,919 | Byrne | Oct. 16, 1934 |
| 2,281,810 | Stone | May 5, 1942 |